United States Patent [19]

Nakamura

[11] 4,161,620
[45] Jul. 17, 1979

[54] ELECTRIC ARC FURNACE FOR STEEL MAKING, WITH NO REFRACTORY BRICKS AT THE FURNACE WALL

[75] Inventor: Syoji Nakamura, Osaka, Japan

[73] Assignee: Kyoei Seiko Kabushiki Kaisha, Osaka, Japan

[21] Appl. No.: 847,472

[22] Filed: Oct. 31, 1977

[30] Foreign Application Priority Data

Nov. 17, 1976 [JP] Japan .................. 51-138684

[51] Int. Cl.² .............................................. F27D 1/12
[52] U.S. Cl. ..................................................... 13/32
[58] Field of Search ................... 13/32, 35; 110/336; 266/280, 282; 432/238

[56] References Cited

U.S. PATENT DOCUMENTS 3,843,106  10/1974  Nanjyo et al. ............... 13/32 X
3,952,140  4/1976  Wunsche .......................... 13/35

Primary Examiner—R. N. Envall, Jr.
Attorney, Agent, or Firm—Wenderoth, Lind & Ponack

[57] ABSTRACT

An electric arc furnace for steel making includes a shell portion and a separate furnace bed portion made, the shell portion having a plurality of water-cooling boxes, instead of refractory bricks, along its inner circumferential surface, and the furnace bed portion being made slightly larger in outside diameter than the shell portion, the two portions being separably combined into a furnace.

3 Claims, 8 Drawing Figures

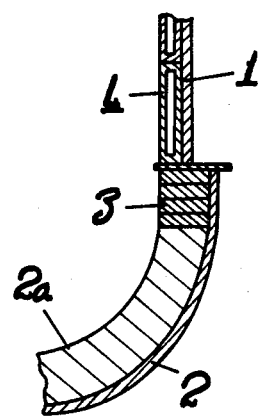
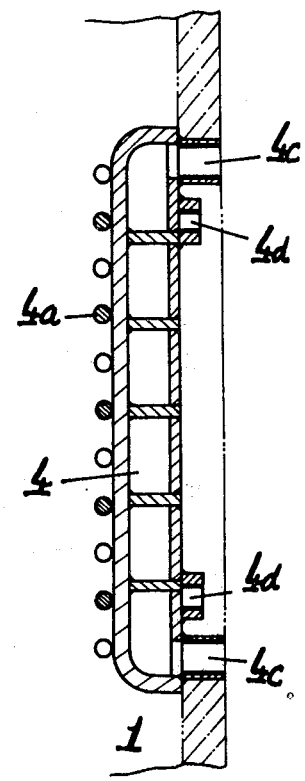
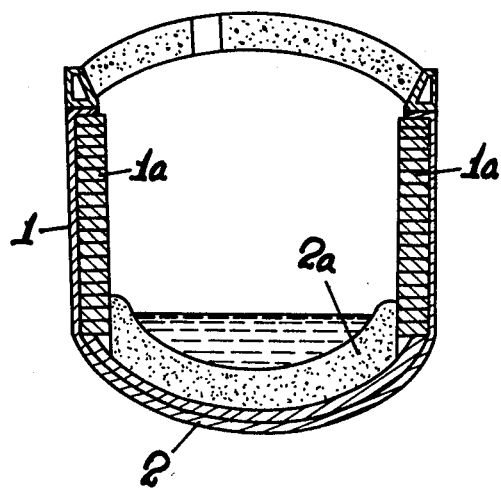

ELECTRIC ARC FURNACE FOR STEEL MAKING, WITH NO REFRACTORY BRICKS AT THE FURNACE WALL

BACKGROUND OF THE INVENTION

This invention relates to an electric arc furnace which comprises a shell portion having many water-cooling boxes, instead of refractory bricks, along its inner circumferential surface and a furnace bed portion which is made slightly larger in diameter than the shell portion. The two portions are made separately and the shell portion is laid upon the bed portion to be combined into a furnace proper.

In a conventional electric arc furnace for use in steel making, the furnace wall is constructed by stacking refractory bricks as shown in FIG. 8 of the accompanying drawings. Since the refractory bricks in the vicinity of the three electrodes usually disposed in the furnace, i.e. the refractory bricks at the so-called hot spot, are subjected to the high heat of electric arcs and may reach a temperature of about 3,000° C., high class refractory bricks are used at the hot spot. Due to a recent trend towards operating such a furnace at higher power, using a transformer of large capacity for obtaining the high productivity, the refractory bricks which constitute the furnace wall are subjected to a higher heat and as a result, the service life of the furnace wall has been considerably shortened. The refractory bricks at the hot spot which are subjected to an exceedingly high heat soon yield to the high heat, in some cases only several days after the furnace wall was last repaired. As a countermeasure to such disadvantage, the present practice is to carry out repairs while the refractory bricks are still hot, i.e. before scrap is charged after each teeming, refractory is sprayed upon the surface of the refractory bricks, thereby reinforcing the refractory bricks of the furnace wall. However, this method has the drawback of requiring much labour for reinforcing of the refractory bricks after each teeming, thus lowering productivity and increasing the cost of steel manufacturing.

Furthermore, in the case of a conventional furnace with a shell portion and a bed portion made as single unit, the refractory material of the shell portion and those of the bed portion differ in useful lives, that is, the useful life of the former is shorter than that of the latter. This difference in useful lives is attributed to the influence of arcs, temperature, scrap and other factors in the furnace. Thus, whenever any damage is sustained by refractories of the shell portion, even if the refractories of the bed portion are still in good condition and need no repair, the use of the furnace must be suspended while the damaged refractories of the shell portion are repaired, with the result of a lowering of the operating efficiency of the furnace.

SUMMARY OF THE INVENTION

In view of the above-mentioned defects of the conventional furnace, the present invention provides an electric arc furnace which comprises a shell portion and a furnace bed portion made separately, the shell portion having a plurality of block-shaped water-cooling boxes, instead of refractory bricks which are inferior in durability, along its inner circumferential surface in order to improve the durability of the furnace wall and to reduce the cost of steel making. Several shell portions may be kept as spare parts so that when a damaged shell portion is being repaired, a spare shell portion can replace it to avoid a substantial interruption of the steel-making operation.

BRIEF DESCRIPTION OF THE DRAWING

The nature and advantages of the present invention will be understood more clearly from the following description made with reference to embodiments of the present invention and accompanying drawings, in which:

FIG. 5 and FIG. 6 are respectively a front view and a sectional view showing details of the water-cooling box in FIG. 4;

FIG. 7 is a detailed sectional view showing the joint between a shell portion and a bed portion of the furnace; and FIG. 8 shows in cross-section an example of a known furnace.

DETAILED DESCRIPTION OF THE INVENTION

Figure 3:
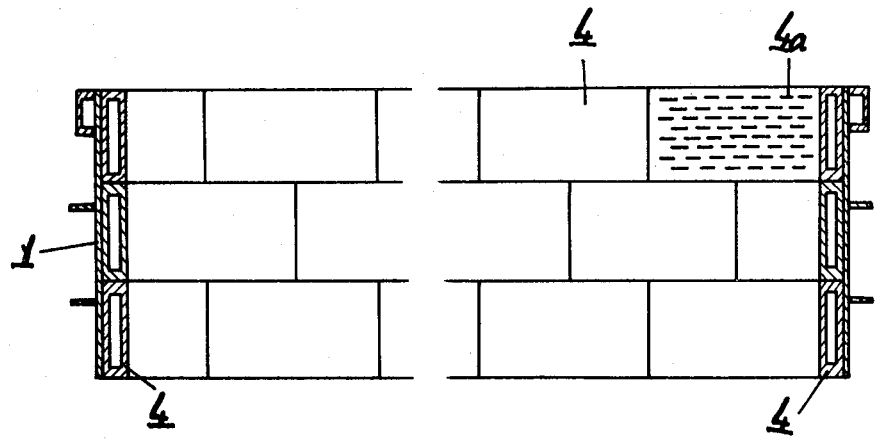
FIG. 3 is a detailed sectional view showing a part of the shell portion shown in FIG. 1.
Figure 4:
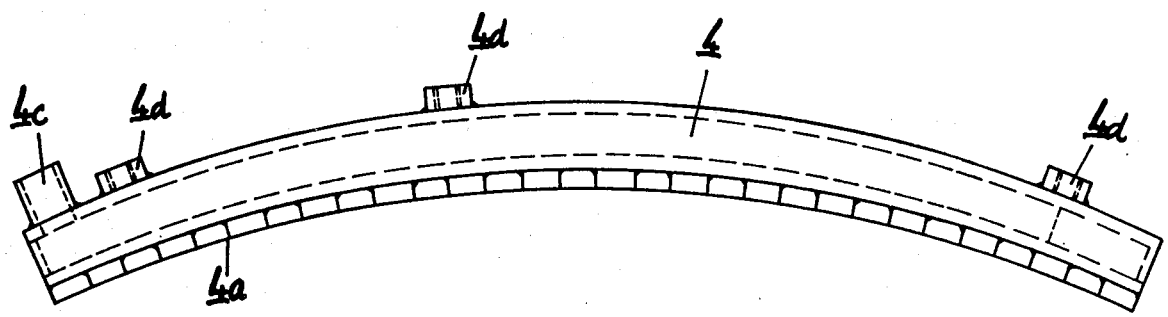
FIG. 4 is a plan view of a water-cooling box.
Figure 5:
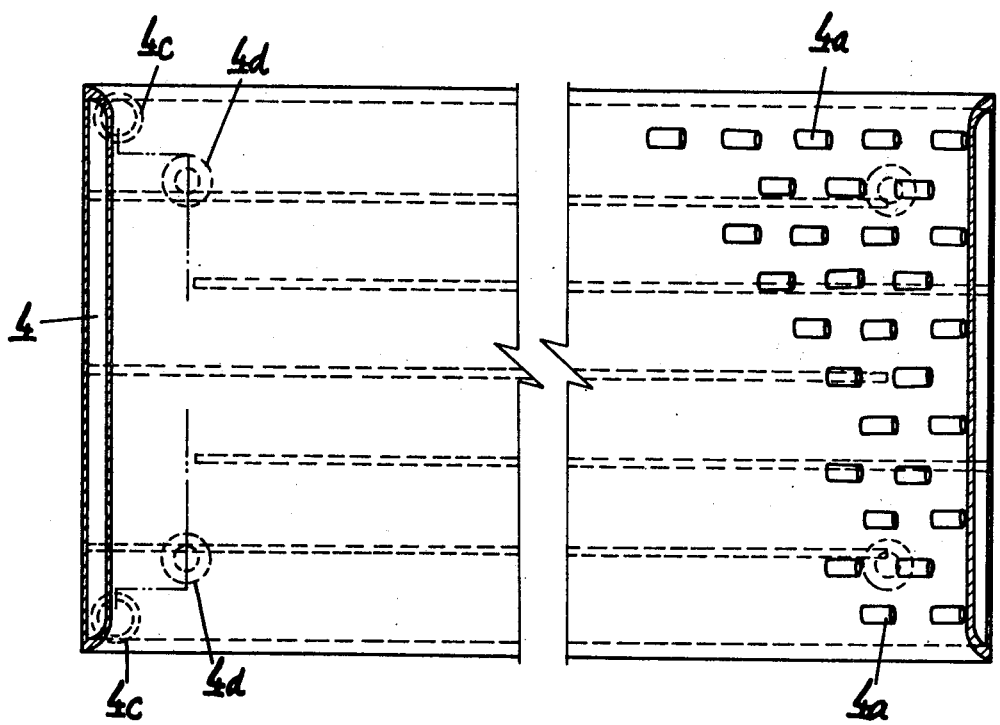

Referring to the drawings, numeral 1 designates a shell portion of an electric arc furnace having the required capacity and shape. The shell portion 1 is made of steel plate and is placed on top of a bed portion 2. The bed portion 2 is provided with a furnace floor stamp 2a of refractory material and is made slightly larger in outside diameter than the shell portion 1. Refractory bricks 3 are stacked on the furnace floor stamp 2a along the inner circumferential surface of the bottom part of the shell portion 1. Onto the refractory bricks 3 thus stacked, the shell portion 1 is joined directly or with the aid of a guide 2b. Along the whole inner circumferential surface of the shell portion 1 above the refractory bricks 3, block-shaped water-cooling boxes 4 made of steel plate are arrranged in layers. These water-cooling boxes 4 are of rectangular cross section as shown in the drawing or of square cross-section and are curved so as to conform to the cylindrical form of the shell, as shown in FIG. 4. Such water-cooling boxes may be replaced by short tubes of the required arc shape. Usually, water-cooling boxes are laid in two layers, but depending upon the size of the furnace or depending upon the size and the shape of the water-cooling box, they will be placed in more layers, for example, three layers as shown in FIG. 3. In this case, it is better to align the water-cooling boxes in zigzag form for the stabilization of the furnace, as shown in FIG. 3. Slag catchers 4a are provided at the front or inner surface of the water-cooling boxes (FIG. 5, FIG. 6), preferably on the same level with the slag line. These slag catchers 4a are short pieces of rods fixed in a scattered manner to the front surface of water-cooling boxes. Slag is caught by these slag catchers, and the thus caught slag acts as an adiabatic material. The water-cooling box 4 is hollow and has at the rear surface thereof or at the surface which makes contact with the shell portion, threaded holes 4d in which a fixing member such as a bolt is screwed to fix the water-cooling box to the shell portion. In this manner, each water-cooling box 4 is fixed to the inner circumferential surface of the shell, so as to constitute the desired inner wall of the furnace. Vertically contiguous water-cooling boxes are connected with each other directly or with the aid of a filler 4b such as fire bricks or magnesia cement. Protruding from the upper part and the lower part of a rear or outer surface of the water-cooling box 4 are tube joints 4c which are passed through the shell when the water-cooling box 4 is fixed to the shell 1. The tube joints 4c are connected to a cooling tube or a cooling tank for circulating cooling water so that cooling water is led into the water-cooling box from outside the furnace and is circulated to effect the desired cooling.

The furnace bed portion 2 on which the shell portion 1 is to be placed, is dish-shaped. The bed portion 2 is made of steel plate (or iron plate) and is slightly larger in outside diameter than the shell portion. The inner surface of the bed portion 2 is covered with the furnace bed stamp 2a of refractory material. The top surface of the refractory bricks 3 is covered with a folded end of the steel plate (or the iron plate), preferably on which are provided at least two upstanding guides 2b. The shell portion 1 and the bed portion 2 thus formed are combined together to form the desired arc electric furnace. By utilizing guides 2b when the two portions are joined together, the shell portion can be connected exactly and easily in the desired position on the bed portion. The guides 2b may be dispensed with. They may be replaced by making a part of the top surface of the bed portion recessed so that the shell portion is set and received therein.

Figure 1:
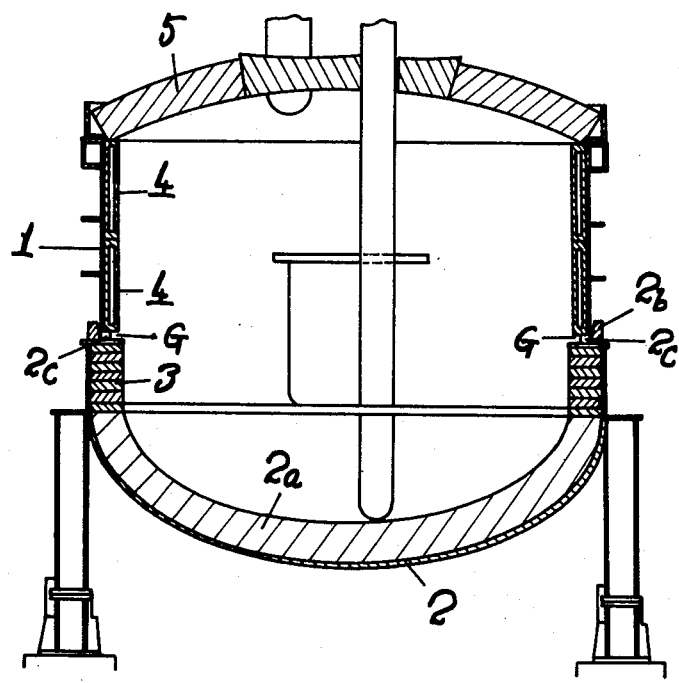
FIG. 1 is a vertical cross-sectional view of a furnace in accordance with the present invention.
Figure 2:
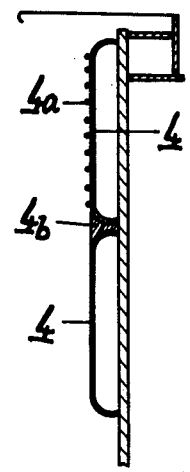
FIG. 2 is a vertical cross-sectional view of a different embodiment of water-cooling boxes to be used at the shell portion.

If there is a gap between the shell portion 1 and the bed portion 2, such gap can be filled with refractory material 2c prior to the use of the furnace. Alternatively such gap will automatically be filled with slag which is produced during furnace operation. Thus, gases produced in the furnace can be prevented from leaking out. In FIG. 1, numeral 5 is a furnace roof laid on the shell portion 1.

According to the present invention, the water-cooling boxes 4 are provided in such a fashion that they cover the whole circumferential surface in the furnace above the level of the slag line of the electric arc furnace. When the furnace is used while circulating the cooling water in the water-cooling boxes, immediately after the start of operation, slag of a moderate thickness becomes stuck to the slag catchers. Since the furnace is used under such condition, this slag adhered to the surface of the water-cooling boxes suppresses an excessive rise of temperature at the surface of the water-cooling boxes and accordingly the water-cooling boxes are protected from being damaged by the high temperature in the furnace and also absorbs less heat in the furnace. If cooling water should leak into the furnace due to damage to one of the water-cooling boxes, such water will evaporate instantly or will evaporate continuously at the surface of the molten steel, without any entry of cooling water into the molten steel, and thus any danger of explosion by instantaneous expansion can be prevented.

The above described embodiment of the invention provides the advantages that it ensures a long life of the furnace wall in comparison with the refractory brick composition, a lower cost of the water-cooling boxes than of refractory bricks, a lower initial installation cost because of the smaller outside diameter of the shell in relation to the furnace capacity, and no need for repeated repairs of the furnace wall. Moreover, as the thickness of the water-cooling box can be made smaller than the thickness of the refractory bricks, an electric furnace according to the present invention may have a larger inside diameter than the conventional electric furnace of the same outside diameter, with the result of a larger holding capacity and a higher productivity of the furnace.

The electric arc furnace is divided into the water-cooling system shell portion and the furnace bed portion. By keeping spares of the shell portion whose refractory material is frequently damaged, when the refractory material of a shell portion is damaged, the shell portion is removed from the furnace and replaced by a spare one. Thus, the furnace operation can be resumed in a short time. The electric arc furnace specifically described above has an improved durability so far as its wall is concerned, thereby improving its productivity and reducing the steel-making cost.

What is claimed is:

1. An electric arc furnace for use in the manufacture of steel, said furnace comprising:
   a furnace bed portion lined with refractory material;
   a solid metal shell portion made separately from said bed portion and having an outer diameter which is less than the outer diameter of said bed portion, said shell portion being joined to the top of said bed portion and extending upwardly therefrom; and
   a plurality of hollow metal water-cooling boxes arranged in plural layers and attached to and covering the entire inner surface of said shell portion above the slag line of the furnace, said metal boxes forming the inner furnace wall and being directly exposed to the heat in the furnace during use thereof.

2. A furnace as claimed in claim 1, further comprising means for retaining a layer of slag on the inner surface of said furnace wall, said slag retaining means comprising a plurality of short metal rods attached to the inner surfaces of said boxes.

3. A furnace as claimed in claim 1, further comprising guide means between said bed portion and said shell portion for facilitating joining thereof.

* * * * *